United States Patent
Baron et al.

(10) Patent No.: US 9,668,002 B1
(45) Date of Patent: May 30, 2017

(54) IDENTIFICATION OF LIVE STREAMING CONTENT

(71) Applicant: Amazon Technologies, Inc., Seattle, WA (US)

(72) Inventors: Bradley Michael Baron, Seattle, WA (US); James Cleveland Willeford, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/946,612

(22) Filed: Nov. 19, 2015

(51) Int. Cl.
 *H04N 21/2187* (2011.01)
 *H04N 21/488* (2011.01)
 *H04N 21/482* (2011.01)
 *H04N 21/472* (2011.01)

(52) U.S. Cl.
 CPC ... *H04N 21/2187* (2013.01); *H04N 21/47202* (2013.01); *H04N 21/47208* (2013.01); *H04N 21/4826* (2013.01); *H04N 21/4884* (2013.01)

(58) Field of Classification Search
 None
 See application file for complete search history.

(56) References Cited

U.S. PATENT DOCUMENTS

| | | | | |
|---|---|---|---|---|
| 8,151,291 | B2* | 4/2012 | Ramaswamy | H04H 60/58 |
| | | | | 725/14 |
| 9,386,352 | B1* | 7/2016 | Shoykhet | H04N 21/47217 |
| 2012/0036537 | A1* | 2/2012 | Klappert | H04N 5/782 |
| | | | | 725/50 |
| 2016/0110877 | A1* | 4/2016 | Schwartz | G06F 17/30038 |
| | | | | 382/107 |

OTHER PUBLICATIONS

Wang, Avery Li-Chun, "An Industrial-Strength Audio Search Algorithm" *Proceedings of the 4th International Conference on Music Information Retrieval* pp. 1-7.

* cited by examiner

*Primary Examiner* — Omar S Parra
(74) *Attorney, Agent, or Firm* — Weaver Austin Villeneuve & Sampson LLP (57) ABSTRACT

The identification of live streaming content supports a broad range of applications. Information is extracted from the live content as it is being delivered to viewers, generating a feature set that is then compared to feature sets corresponding to known content. Once the content is identified, any of a variety of actions may be taken depending on the application.

21 Claims, 3 Drawing Sheets

IDENTIFICATION OF LIVE STREAMING CONTENT

BACKGROUND

Live streaming content includes online channels or feeds presenting a wide range of offerings intended to be delivered to viewers in near real time. This includes, for example, pre-recorded scheduled content (e.g., premium movie channels) and content generated in real time (e.g., sporting events, concerts, etc.), as well as a broad range of niche or specialized content from a similarly broad range of content providers. Unlike content which is available on demand, the timing of the presentation of live content (at least initially) is controlled by the broadcaster. Live content providers sometimes have associated programming guides or schedules, but these vary considerably in terms of their detail, quality, and accuracy. Some live content providers don't provide any such guides.

DETAILED DESCRIPTION

This disclosure describes techniques by which live streaming content (also referred to herein as live content) may be identified to support a broad range of applications. This might include, for example, constructing programming guides for live content channels that don't include them, as well as correcting or augmenting the information provided in existing programming guides. Information is extracted from the live content as it is being delivered to viewers, generating a feature set that is then compared to feature sets corresponding to known content or at least known types of content. Once the live content is identified based on the comparisons of these feature sets, any of a variety of actions may be taken depending on the application. An example of a particular use case may be instructive.

A provider of niche content, e.g., Japanese anime series, broadcasts live content for which no programming schedule is available. Closed-caption information is extracted from a stream of the live content, tokenized, and compared to a library of closed-caption tokens to determine whether the live content corresponds to content in an existing catalog. If such a correspondence is found and the live content identified (e.g., Season 1, Episode 39, of Lizard Cube X), metadata representing the identified content (derived from any of a variety of sources) may be used to construct an information interface so that, when the viewer wants to know what he his watching, he can select an "info" control, and a screen of detailed information about the live content can be presented (e.g., superimposed over or combined with the live content) in much the same way that such information is presented in a cable or satellite television guide when the "info" or "guide" button is pressed on the remote. As will become apparent with reference to the description below, the types of information that may be extracted from live content to construct a feature set for comparison are numerous and diverse. The types of actions that may be taken in response to the identification of content are similarly numerous and diverse.

Figure 1:
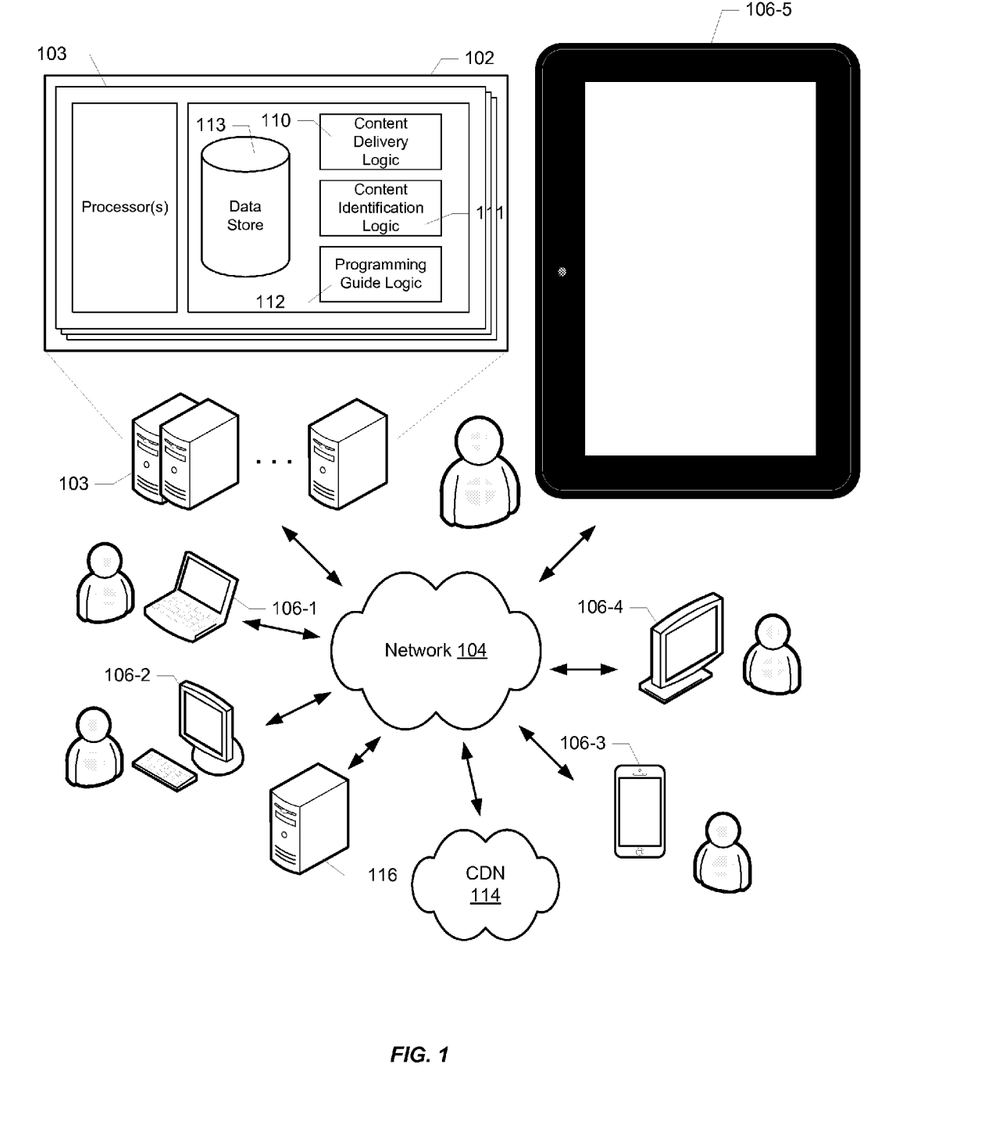
FIG. 1 is a simplified diagram of a computing environment in which various implementations may be practiced.

FIG. 1 illustrates an example of a computing environment in which a video content service 102 provides live streaming content (e.g., audio and/or video) via network 104 to a variety of client devices (106-1 through 106-5). Content service 102 may conform to any of a wide variety of architectures such as, for example, a services platform deployed at one or more co-locations, each implemented with one or more servers 103. Content service 102 may be the provider of at least some of the live streaming content, and/or may also aggregate and provide access to live streaming content from a wide range of content providers.

Network 104 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 106 may be any suitable device capable of connecting to network 104 and consuming live streaming content provided by service 102. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 102. Alternatively, such resources may be independent of content service 102, e.g., on a platform under control of a separate provider of computing resources with which content service 102 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 102 is described as if it were integrated with the platform(s) that provides the live streaming content to client devices. However, it will be understood that content service 102 may provide access to live streaming content in conjunction with one or more content delivery networks (e.g., CDN 114) that may or may not be independent of content service 102. The following examples also assume that the logic for identifying live streaming content and the logic for taking action when content is identified are integrated with content service 102. However, it should be noted that both types of logic can each be provided on a separate platform (e.g., as represented by server 116) which may be independent of each other, the content service, and/or the content provider(s) whose live content is delivered by the content service. The range of variations known to those of skill in the art are contemplated to be within the scope of this disclosure.

Some of the implementations enabled by the present disclosure contemplate logic resident on the client devices consuming live streaming content from content service 102; such logic being configured, for example, to extract information, make decisions, and/or present information in conjunction with the identification of live streaming content. The logic might be part of an existing algorithm or module on the client device or implemented to work in conjunction with such an algorithm or module. The logic might be implemented, for example, in a media player on the client device or as a separate application or module resident on the client device. However, the following description assumes implementations in which, in addition to content delivery logic 110 (which facilitates various aspects of content delivery to client devices 106), content service 102 includes logic that facilitates some or all aspects of the identification of live streaming content as described herein (e.g., as represented by content identification logic 111). For example, such logic, might perform feature extraction, feature comparison, and content identification.

Content service 102 may also include logic that takes one or more actions when content is identified by logic 111. In FIG. 1, this logic is represented, by way of example, as programming guide logic 112 which may be configured to generate programming guide information and/or programming guide interfaces for live streaming content, and/or correct or augment existing programming guide information and/or interfaces. Again, such logic may be integrated to varying degrees with or independent of content service 102, content delivery logic 110, content identification logic 111, CDN 114, etc. More generally, logic 112 represents a broad range of applications that depend on or use the identification of live streaming content as enabled by the present disclosure. The scope of this disclosure should therefore not be limited by reference to the generation or modification of programming guide information.

In addition to providing access to the live content (which may include aggregation of live content from multiple content providers), content service 102 may also include a variety of information related to live content and/or a catalog of content that includes on-demand content. This information (represented by data store 113 which may be a distributed data store) may include, for example, stored content, metadata for both on-demand content and live streaming content, manifests, programming guides, feature sets representing both known content and live content, feature sets extracted from live content streams, etc. Alternatively, this and/or additional information about the live content, as well as the live content itself may be provided and/or hosted by one or more separate platforms, e.g., CDN 114 or server 116. From these examples, those of skill in the art should understand the diversity of use cases to which the techniques described herein are applicable.

Figure 2:
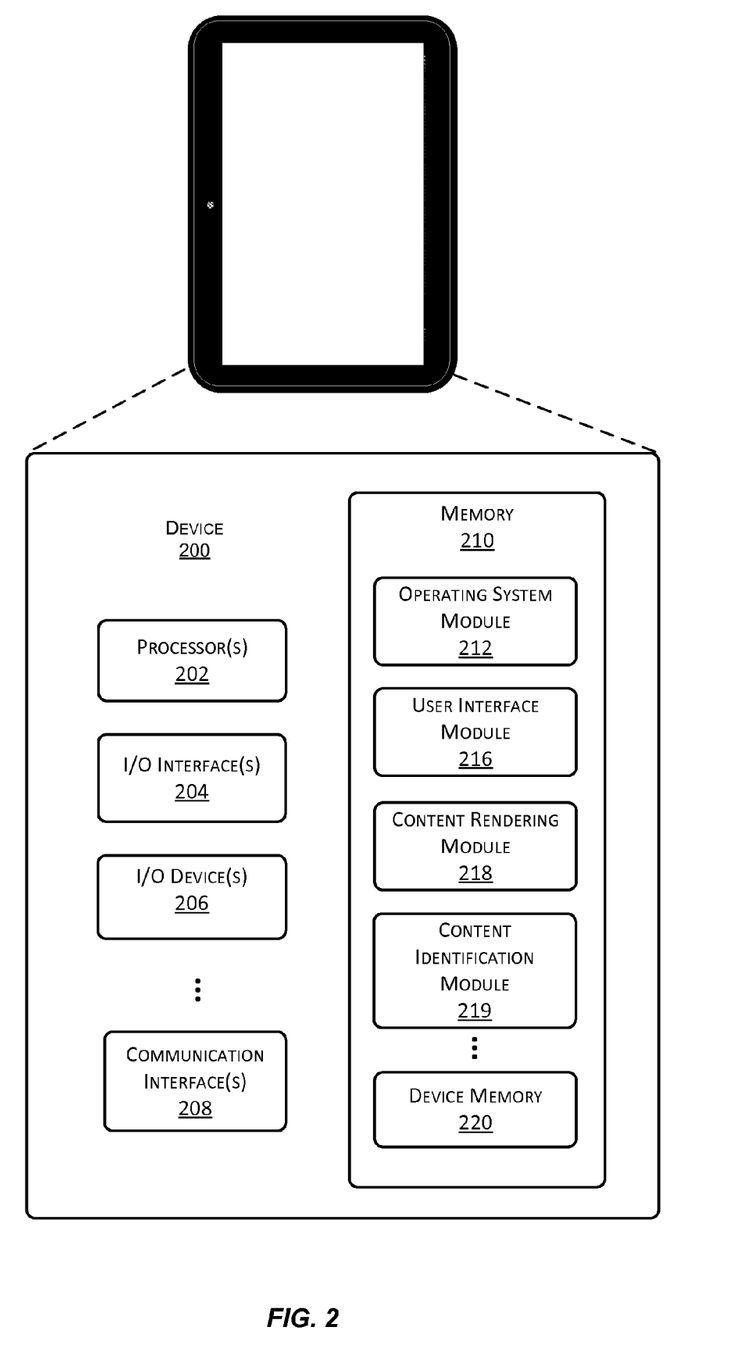
FIG. 2 is a simplified diagram of a client device that may be used with various implementations.

A block diagram of an example of a client device 200 suitable for use with various implementations is shown in FIG. 2. Device 200 includes one or more single or multi-core processors 202 configured to execute stored instructions (e.g., in device memory 220). Device 200 may also include one or more input/output (I/O) interface(s) 204 to allow the device to communicate with other devices. I/O interfaces 204 may include, for example, an inter-integrated circuit (I2C) interface, a serial peripheral interface (SPI) bus, a universal serial bus (USB), an RS-232 interface, a media device interface, and so forth. I/O interface(s) 204 is coupled to one or more I/O devices 206. The I/O device(s) 206 may include one or more displays, one or more haptic generators, a touch sensor array, one or more accelerometers, one or more image capture systems, one or more motion sensors, one or more orientation sensors, microphones, speakers, and so forth.

Device 200 may also include one or more communication interfaces 208 configured to provide communications between the device and other devices. Such communication interface(s) 208 may be used to connect to cellular networks, personal area networks (PANs), local area networks (LANs), wide area networks (WANs), and so forth. For example, communications interfaces 208 may include radio frequency modules for a 3G or 4G cellular network, a WiFi LAN and a Bluetooth PAN. Device 200 also includes one or more buses or other internal communications hardware or software (not shown) that allow for the transfer of data and instructions between the various modules and components of the device.

Device 200 also includes one or more memories (e.g., memory 210). Memory 210 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 210 provides storage for computer readable instructions, data structures, program modules and other data for the operation of device 200. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 210 includes at least one operating system (OS) module 212 configured to manage hardware resources such as I/O interfaces 204 and provide various services to applications or modules executing on processor(s) 202. Memory 210 also includes a user interface module 216, a content rendering module 218, and other modules. Memory 210 also includes device memory 220 to store a wide variety of instructions and information using any of a variety of formats including, for example, flat files, databases, linked lists, trees, or other data structures. In some implementations, a portion of device memory 220 may be distributed across one or more other devices including servers, network attached storage devices, and so forth.

At least some of the logic or computer program instructions used to support the identification of live streaming content as described herein (represented by content identification module 219) may be resident on client device 200. For example, at least some of this functionality may be implemented as part of the code of a media player operating on device 200. Alternatively, module 219 may be implemented separately from the device's media player. Suitable variations and alternatives will be apparent to those of skill in the art. It will also be understood that device 200 of FIG. 2 is merely an example of a device with which various implementations enabled by the present disclosure may be practiced, and that a wide variety of other devices types may also be used (e.g., devices 106-1 to 106-5). The scope of this disclosure should therefore not be limited by reference to device-specific details.

Figure 3:
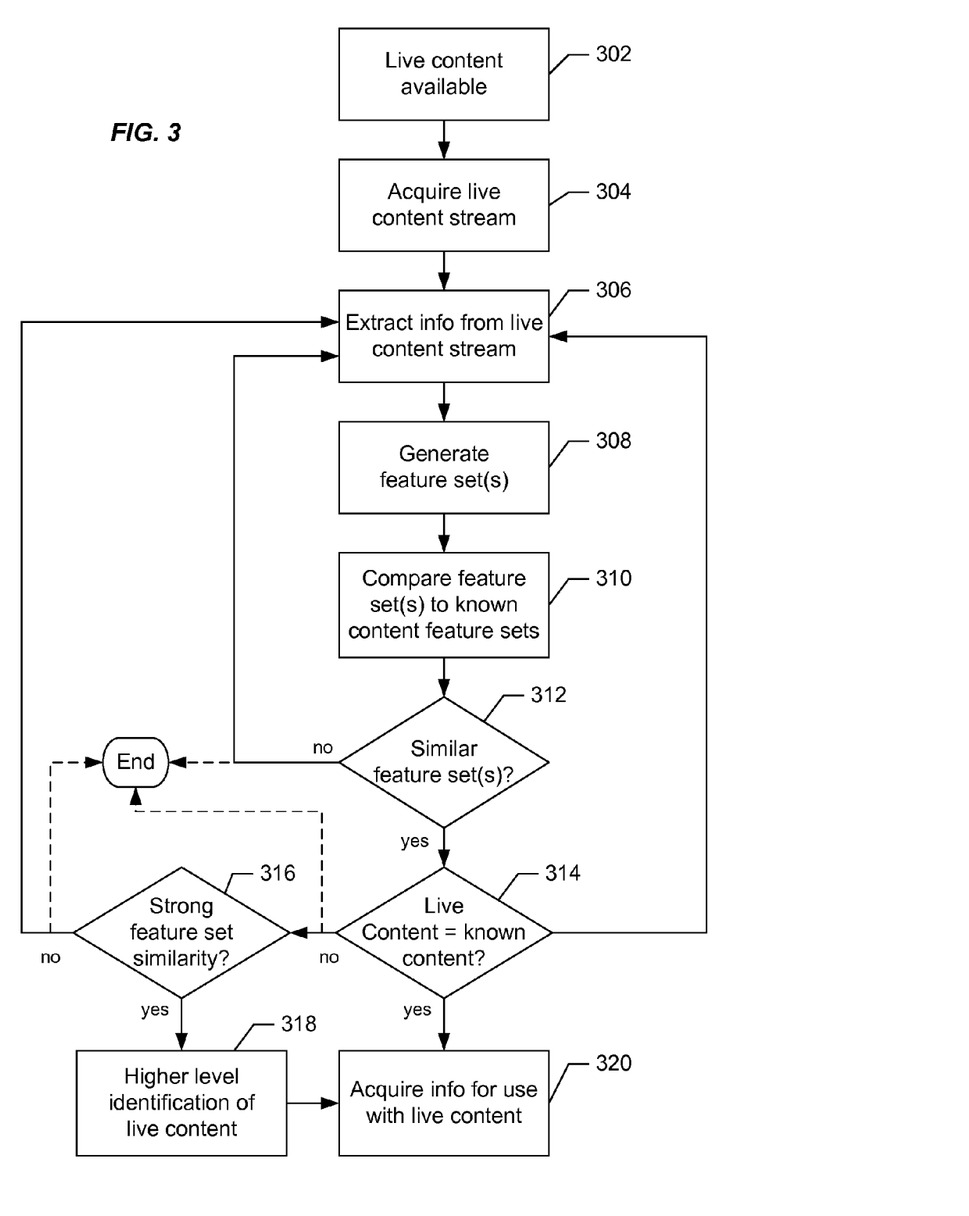
FIG. 3 is a flowchart illustrating operation of a particular class of implementations.

The identification of live streaming content according to a particular implementation is illustrated in the flowchart of FIG. 3. This example assumes the use of H.264 encoding for video content. However, it will be understood that the basic principles described herein may be employed with any of a variety of video and audio codecs including, for example, MPEG-1, MPEG-2, MPEG-4 Part 2, VC-1, H.263, VP8, VP9, Daala, and H.265 (also commonly referred to as HEVC). Playback of content on client devices is assumed to be facilitated via a resident media player, web browser, or mobile app. Access to content over the Internet is typically governed by a DRM system such as Google's Widevine, Microsoft's PlayReady, Apple's FairPlay, or Sony's OpenMG to name a few representative examples. Live streaming content is typically delivered in an encrypted stream using any of a variety of encryption technologies including, for example, various Advanced Encryption Standard (AES) and Elliptic Curve Cryptography (ECC) encryption techniques. It should be noted that the techniques described herein are compatible with a wide range of content services, media players, DRM systems, and encryption technologies, the details of which are known to those of skill in the art. The nature and operation of these technologies will therefore not be described in detail to promote clarity.

When live content becomes available for streaming to clients (302), e.g., either directly from a content provider or via a content aggregator (e.g., content service 102), a corresponding live content stream is acquired (304). The acquired live content stream may be a stream being delivered to a client device, or an independent stream acquired for the purpose of content identification as enabled by the present disclosure. The acquisition of the stream may be done by virtual or hardware devices that are integrated with or independent of the content service by which the client devices are accessing the content. It should be noted that acquisition of the stream for the purpose of content identification does not require that the live content be rendered and displayed. A wide variety of types of information may be extracted from the live content stream (306) to support identification of the live content depending on the nature of the content and/or the requirements of the particular application. One example is closed-caption information.

That is, much video content has associated time-coded text (e.g., representing dialog, voice over narration, etc.) that is configured for onscreen presentation in conjunction with playback of the video content for hearing impaired viewers. This text is a rich source of information and may be highly suited for specifically identifying content. This text can be extracted and tokenized (e.g., using natural language processing techniques) for comparison to an index which maps phrases to known content (and potentially to specific playback points in the content). Speech captured from audio content (e.g., using speech-to-text conversion techniques) may be similarly useful even where the live content does not have a closed-caption component.

Another source of text from the live content may be the opening and/or closing credits. Any of a variety of alphanumeric character recognition techniques may be applied to images from frames of video content to generate this information. As will be appreciated, such information may be a particularly useful in recognizing content in that it is likely to represent important pieces of information (e.g., title, actors, etc.) that may be used to identify the content with a high level of confidence.

As will be appreciated, the ordering of tokenized text can be leveraged to increase or decrease the confidence level associated with content identification. That is, for example, as consecutive tokens extracted from live content are matched to consecutive tokens derived from known content, each successive match increases the confidence that the live content corresponds to the known content. By contrast, even if matches are found for multiple phrases, confidence would decrease if the phrases in the live content aren't encountered in the same sequence that they occur in the known content.

And even if text derived from live content isn't tokenized for matching in this way, it still may be useful for identifying content. For example, according to some implementations, text derived from the live content may be processed to identify subject matter or topics to which it relates. In another example, sentiment analysis might be used to determine the attitude of a speaker or a writer with respect to a topic or the overall context of the content. As will be appreciated, such information may be useful as another point of reference by which the confidence level associated with content identification may be enhanced.

In another class of examples, some portion of the audio and/or video content itself can be extracted and used to generate a variety of types of digital "fingerprints" or "signatures" that may be compared to similar information derived from known content. For example, one kind of video fingerprint can be derived by segmenting video frames of the content into blocks of pixels (e.g., 64×64), computing an average color, and combining this information to characterize some duration (e.g., 30 seconds) of the video. Another kind of video fingerprint might be derived by identifying scene changes in the content (e.g., by comparing changes in successive frames or detecting black frames), with the fingerprint representing the timing of the changes over one or more ranges of the content.

Similarly, digital fingerprints may be generated from audio content. For example, hash values may be calculated using the audio samples associated with spectrogram peaks, resulting in a constellation of temporally localized data points as described, for example, in *An Industrial-Strength Audio Search Algorithm*, Avery Li-Chun Wang, October 2003, the entirety of which is incorporated herein by reference for all purposes. A variety of other suitable techniques are known or within the capabilities of those skilled in the art.

In another class of examples, specific humans represented in the live content may be identified using any of a variety of voice and/or facial recognition techniques. Yet another class of examples relates to available metadata associated with live content. For example, an important piece of information might be the identity of the content provider or broadcaster. Such information might be useful, for example, to support correlation of a broadcast of live content in the Pacific time zone with previously identified content from that content provider on the East coast occurring three hours earlier. As will be appreciated, such information, when used in conjunction with other information may be useful for increasing the confidence level of a detected similarity and/or a content identification.

As will be appreciated from the diversity of the foregoing examples, the types of information that may be extracted from live content for the purpose of identifying the content may vary considerably. More generally, any information contained in or associated with live content that represents one or more characteristics of the live content useful for identification purposes may be employed by content identification techniques enabled by the present disclosure. The scope of this disclosure should therefore not be limited by reference to the specific examples described herein.

Referring again to the example of FIG. 3, the information extracted from the live video stream is used to generate one or more feature sets for use in comparison with similar feature sets derived from known content (308). Such a feature set might be represented, for example, as a vector of values in which each position in the vector represents an aspect of the information from which it was derived. For example, a feature set might include values representing a sequence of closed-caption tokens. Another feature set might be a representation of a detected human voice. Another feature set might be a representation of facial features of a detected human face. Yet another feature set might represent a digital signature of the content. A feature set might represent multiple types of extracted information, or might be dedicated to only a single type. More generally, feature sets may be represented using any of a variety of formats and techniques that are amenable to comparison with similar feature sets representing known content.

The one or more feature sets representing the live content are then compared to feature sets representing known content (310). A common choice for the comparison of feature vectors is the cosine similarity, i.e., a measure of the similarity between two vectors. If two items of content $f_i$ and $f_j$ are represented by the feature vectors:

$\vec{x}_i = (x_{i1} \ldots x_{im})$ and $\vec{x}_j = (x_{j1} \ldots x_{jm})$,
the cosine similarity is defined as:

$$\text{sim}(f_i, f_j) = \cos(\theta_{f_i f_j}) = \frac{\vec{x}_i \cdot \vec{x}_j}{\|\vec{x}_i\| \|\vec{x}_j\|} = \frac{\sum_{k=1}^{m} x_{ik} \, x_{jk}}{\sqrt{\sum_{k=1}^{m} x_{ik}^2} \sqrt{\sum_{m=1}^{m} x_{jk}^2}}$$

As will be appreciated, this is merely one example of a way of determining a similarity measure for feature sets representing content. The scope of the present disclosure should therefore not be limited with reference to this example.

According to a specific implementation, the features sets for the known content are represented in an index associated with a catalog of known content titles maintained by a content service (e.g., content service 102). The index might refer, for example, to on-demand content as well as previously identified live content. The corresponding feature sets may be derived from the known content in an offline process which may result in a much richer representation of the known content than is derived in real time from the live content being identified.

For example, a feature set representing closed-caption information from known content might include tokens or values representing text from a much longer duration of the content than the closed-caption feature set derived from the live content to which it is compared. Similarly, the representations of an actor's voice or face derived from known content might be more detailed including, for example, multiple representations captured from different scenes, or even from different titles. Having feature sets for the known content that are richer than the feature sets derived from the live content allows for identifying content with different levels of confidence as may be appropriate for a given application.

And while the corpus of information from which feature sets may be extracted could be an existing catalog of content titles, a wide range of other sources may be used for this purpose. For example, snippets of content on popular video sharing sites could be mined to derive feature sets for later comparison. In another example, content from particular broadcast channels can be mined to derive feature sets that can be used for at least partial identification (e.g., for episodic content, live events with common features, etc.). And feature sets generated from the live content may also be added to the index and subsequently used for comparison.

Depending on the application, the comparison may involve multiple feature sets representing different types of information extracted from the live content. Alternatively, only a single feature set might be used. According to some implementations, a similarity or correspondence between a feature set of the live content and a feature set of known content is found where the confidence level associated with the similarity measure or the degree of the similarity itself exceeds a threshold. The threshold may be set higher or lower to suit the application. For example, where content identification involves the use of multiple feature sets, the respective threshold for any given feature set might be set relatively low because the confidence in the eventual content identification relies on the diversity of information used rather than the degree of similarity for any given characteristic of the content. On the other hand, where the identification of the content relies on a single feature set representing only one type of information extracted from the live content, a higher confidence threshold might be more appropriate.

If the feature set(s) of the live content is(are) sufficiently similar to one or more feature sets for the known content (312), a determination is made as to whether the live content corresponds to the known content represented by the similar feature set(s) (314). Such a determination might rely, for example, on the number of feature sets for which a correspondence is found and/or the confidence levels or degrees of similarity associated with those feature sets. In the example in which only a single feature set is used, this determination may be based on the degree of similarity between the two feature sets. On the other hand, when multiple feature sets are used, this determination might require some combination of information representing the similarities across the multiple feature sets. For example, an aggregate confidence level might be derived from the confidence levels associated with each similar feature set. Additionally or alternatively, the determination might require sufficiently strong similarities for at least some number of feature sets (e.g., more than just one or two). It should also be noted that some features may contribute more to this determination than others. For example, a similarity based on closed-caption information might be more heavily weighted than a similarity based on identification of an actor.

According to a specific implementation, where feature set similarities do not support identification of a specific content title (314), a sufficiently high degree of similarity with one or more of the feature sets (316) might still support a less precise content identification (318) that represents, for example, a set of content titles or a category of content. As will be appreciated, even a less than exact identification may still prove useful for given applications. For example, even if the specific content title cannot be identified with sufficient confidence, a high level of confidence that the live content includes a particular actor (e.g., as identified by voice or facial recognition) might support the presentation of biographical or trivia information about the actor in conjunction with playback of the live content, or identification of the content as corresponding to a particular genre, e.g., action film. In another example, a high level of confidence that the opening credits of live content correspond to particular episodic content might support identification of a show even if the particular episode can't be identified (e.g., because it's a new episode).

In another example, a similarity measure based on a digital audio or video fingerprint of a portion of a regularly broadcast event might be sufficient to identify the type of event. Information from other sources might then be used to support a more precise identification. For example, a regular college football broadcast on a given network typically begins with the same opening montage. A feature set representing an audio fingerprint of the music for the opening montage might support identification of the live content as a college football game. Information retrieved from a schedule of college football games (e.g., on an independent web site) could then be used to identify the likely participants.

If no similar feature set(s) for the live content feature set(s) is (are) found (312), or no content identification can be made (314 or 316), the process can end (as represented by the dashed arrows). Alternatively, the process can be repeated from any of these points. Repetition could be for a programmable number of times or over a programmable time period, or for the entire duration of the live content. New information generated with each successive pass may be integrated with existing feature sets or be used to generate replacement or additional feature sets. As will be appreciated, the more information that can be acquired and/or the longer the period of time over which information is acquired, the greater the likelihood that the live content will be identified. That is, the longer features are extracted from the live content, the more distinct the feature set(s) becomes, and the greater the confidence level associated with any identified similarities. On the other hand, the longer feature extraction takes, the longer it will be before the content can be identified. An appropriate balance will depend on the application.

Depending on the nature of the content, there may be varying levels of delay between the live playhead (i.e., the latest content fragment available from the broadcaster) and the client playhead (i.e., the current content fragment being rendered by a particular client). In cases where the delay is relatively long, identification of the live content may begin or even be completed before a client begins playback; particularly where the content identification logic is integrated with the content delivery logic. In addition, the balance between the confidence in identified similarities and the delay in identifying the content may vary depending on the application. For example, a very high confidence level might be required for generation of a programming guide as it is undesirable to incorrectly identify content to users. On the other hand, a lower confidence level might be appropriate or sufficient to support recommendations of similar content, or products and services.

According to some implementations, where no identification can be made (either because confidence levels were too low or no similar feature sets were found), the live content can be presented to a human operator for manual validation or identification. This could be someone associated with a back end service (e.g., content service 102), but might also be surfaced to end users to support a kind of crowd sourcing of validation or identification. This could extend to soliciting input from humans regarding errors in reported identifications (e.g., by providing a link in a programming guide for reporting errors). The feature set(s) generated from the live content would then have as high a confidence level as corresponding to known content as feature sets derived from an existing catalog.

According to various implementations, machine learning techniques may be employed to improve the performance of content identification techniques enabled by the present disclosure. Feature sets derived from known content may be used to build, learn, and evolve increasingly accurate content identification models using both supervised and unsupervised techniques such as, for example, regression analysis, principal component analysis, and random forest analysis. More generally, any machine learning techniques suitable for generating and optimizing such models to fit the training data (i.e., the feature sets of the known content) and that are amenable to efficient run-time evaluation are suitable for use with implementations enabled by the present disclosure.

Once an identification of the live content is made (314 or 318), the identification can be used to trigger a specific action such as, for example, acquiring information for use in conjunction with delivery of the live content to client devices (320). As should be appreciated, the range of applications is broad and diverse. That is, the identified content can be thought of as a key into large and diverse set of metadata, any subset of which can be used to take any of a variety of actions depending on the application.

One straightforward example is to inform viewers about what they are currently watching. This might be done in a variety of ways such as, for example, in a pop up window, superimposed on the live content, in a more detailed programming guide, etc. The information might include the name of the title, members of the cast, the year it was produced, any interesting information and/or links to more information about the program and any of its actors, trivia, current scene info, what song is playing, production notes, etc.

Another example is to use the identification to correct errors in, update, and/or augment an existing programming guide. This provides an independent check on the quality or accuracy of the data received from the broadcaster/content provider. For example, when live content runs beyond its scheduled time (e.g., extra innings baseball game), this often is not reflected in a broadcaster's programming guide. Such an occurrence could be detected by determining that the live content is the same as content identified earlier or, alternatively, that the content that was expected to be on at a certain time has not yet started (i.e., because the content identified doesn't match the content identified in the guide). The incorrect information in the programming guide could then be corrected to reflect this. This might even prompt subsequent periodic checks to determine whether the expected program (or an alternate program) has begun, or whether the new program has started from its beginning or somewhere in the middle (e.g., by inspecting time stamps associated with content fragments, GOPs, or individual frames).

The identification of live content can be used to drive recommendations of similar content. In some cases, options might be provided to users to navigate away from the live content. For example, the live content might include the latest episodes from unrelated shows shown back-to-back. Identification of the first broadcast episode (or identification of the second as being different from the first) could be used to provide the option of watching other episodes of the first show rather than proceeding in the live stream to the unrelated content. More generally, identification of live content allows for opportunities to put content in front of the viewer that is both personalized and highly relevant to what the viewer is currently watching.

The identification of live content can also drive recommendations for products and services, providing a wide range of opportunities for product tie-ins, advertising, etc. And as discussed above, recommendations might be supported by a feature-level identification. For example, there might not be a sufficient level of confidence to identify a specific content title, but there might be a high level of confidence that a specific actor is in the content (e.g., via voice or face recognition feature), or that the live content is a sitcom (e.g., because a laugh track was detected). Such a feature-level identification might be sufficient to trigger recommendations or to present auxiliary content even where the live content itself has not been specifically identified.

Techniques enabled by the present disclosure may be used not only to identify the primary content, but also to identify advertisements inserted into the live content. This information might be useful in a variety of ways. For example, if the length of an ad is known, notifications can be sent to viewers who have navigated away from the live content when the ad is ending so they have the opportunity to switch back to the live content. In another example, the identification of ads can be used to support measuring individual and/or group user engagement with particular advertising content. For example, knowing what ads are being inserted in live content and when they are being inserted can be used to support measuring the propensity of users to switch channels based on certain kinds of advertising content, e.g., X % of your viewers switched (or didn't) at time T because you showed an ad for Y. As will be appreciated, such information might be interesting to both advertisers and content providers for a variety of reasons.

The identification of live content might also be leveraged to enhance playback options available to viewers. For example, once live content has been identified, the playback position in the live content of a particular client device can be tracked (e.g., using time-coded closed-caption information). This allows for providing the viewer with the opportunity to resume watching a video-on-demand (VOD) version of that content at or near the playback point at which the viewer stopped the live stream, e.g., by doing a time stamp conversion between the live content and the VOD version based on the closed-caption content. Alternatively, similar functionality could be supported using the time-correlated data points of the respective digital audio or video fingerprints. Thus, not only can live content be placed on a user's watch list for later viewing, the option can be provided for the viewer to pick up right where he left off.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer program product, comprising one or more non-transitory computer-readable media having computer program instructions stored therein, the computer program instructions being configured such that, when executed by one or more computing devices, the computer program instructions cause the one or more computing devices to:
   receive a first live content stream;
   extract first closed-caption information from the first live content stream;
   generate a first set of closed-caption tokens from the first closed-caption information;
   compare the first set of closed-caption tokens to a plurality of sets of closed-caption tokens, the plurality of sets of closed-caption tokens being represented in an index associated with a catalog of content titles, each of the sets of closed-caption tokens represented in the index having been derived from a corresponding one of the content titles;
   determine a similarity measure for the first set of closed-caption tokens and a second set of closed-caption tokens, the second set of closed-caption tokens corresponding to a first content title;
   determine that the live content stream corresponds to the first content title based on the similarity measure for the first set of closed-caption tokens and the second set of closed-caption tokens exceeding a threshold;
   retrieve metadata representing the first content title;
   receive a second live content stream;
   extract second closed-caption information from the second live content stream;
   generate a third set of closed-caption tokens from the second closed-caption information;
   compare the third set of closed-caption tokens to the plurality of sets of closed-caption tokens represented in the index associated with the catalog of content titles;
   determine a similarity measure for the third set of closed-caption tokens and a fourth set of closed-caption tokens;
   determine that the similarity measure for the third set of closed-caption tokens and the fourth set of closed-caption tokens does not exceed the threshold;
   determine that a first token of the third set of closed-caption tokens matches a second token of one of the plurality of sets of closed-caption tokens represented in the index based on a confidence level;
   identify, based on determining that the first token matches the second token, at least one of a particular actor, a set of content titles, or recommended content having one or more characteristics in common with the second live content stream; and
   retrieve metadata representing at least one of the particular actor, the set of content titles, or the recommended content.

2. The computer program product of claim 1, wherein the computer program instructions are further configured to cause the one or more computing devices to:
   extract an additional type of information from the first live content stream;
   generate a first feature set from the additional type of information;
   compare the first feature set to a plurality of feature sets represented in the index, each of the feature sets having been derived from a corresponding one of the content titles; and
   determine a similarity measure for the first feature set and a second feature set corresponding to the first content title;
   wherein the computer program instructions are configured to cause the one or more computing devices to determine that the first live content stream corresponds to the first content title using both the similarity measure for the first set of closed-caption tokens and the second set of closed-caption tokens and the similarity measure for the first feature set and the second feature set.

3. The computer program product of claim 2, wherein each of the plurality of feature sets represented in the index represents an audio fingerprint, a video fingerprint, audio data representing a voice, image data representing a face, voice-to-text data, image-to-text data, or a content provider.

4. The computer program product of claim 1, wherein the computer program instructions are configured to cause the one or more computing devices to determine that the first live content stream corresponds to the first content title by:
presenting a correspondence between the first live content stream and the first content title for validation; and
receiving confirmation that the correspondence is valid.

5. A computer-implemented method, comprising:
extracting first information from a first live content stream;
generating one or more feature sets from the first extracted information;
comparing the one or more feature sets generated from the first extracted information to a plurality of previously generated feature sets, each of the previously generated feature sets having been derived from corresponding known content;
determining a first similarity measure for at least one of the one or more feature sets generated from the first extracted information and one or more of the previously generated feature sets corresponding to first known content;
determining that the first live content stream corresponds to the first known content based on the first similarity measure exceeding a threshold;
acquiring first information related to the first known content;
transmitting the first information to a first client device for presentation with the first live content;
extracting second information from a second live content stream;
generating one or more feature sets from second extracted information;
comparing the one or more feature sets generated from the second extracted information to the plurality of previously generated feature sets;
determining a second similarity measure for at least one of the one or more feature sets generated from the second extracted information and one or more of the previously generated feature sets;
determining that the second similarity measure does not exceed the threshold;
identifying additional known content based on a comparison between a first feature set from the one or more feature sets generated from the second extracted information and a second feature set from the one or more of the previously generated feature sets;
acquiring second information related to the additional known content; and
transmitting the acquired second information to a second client device for presentation with the second live content.

6. The method of claim 5, wherein each of the previously generated feature sets derived from the known content represents closed-caption information, an audio fingerprint, a video fingerprint, audio data representing a voice, image data representing a face, voice-to-text data, image-to-text data, or a content provider.

7. The method of claim 5, wherein each of the previously generated feature sets derived from the known content corresponds to a specific content title, a specific set of content titles, or a category of content.

8. The method of claim 5, further including:
determining that programming guide information for the first live content stream does not match a portion of the acquired first information related to the first known content;
updating the programming guide information using the acquired first information related to the first known content; and
transmitting the updated programming guide information to the first client device for presentation with the first live content stream.

9. The method of claim 5, wherein identifying the additional known content comprises:
determining that a first subset of the first feature set and a second subset of the second feature set matches based on a confidence level;
identifying, based on determining that the first subset matches the second subset, at least one of a particular actor, a set of content titles, or recommended content having one or more characteristics in common with the second live content stream.

10. The method of claim 5, wherein the first information extracted from the first live content stream includes time-coded information, and wherein acquiring the first information related to the first known content comprises identifying a playback position in the first live content stream using the time-coded information.

11. The method of claim 10, further comprising:
identifying a playback position in an on-demand version of the first known content that corresponds to the playback position in the first live content stream; and
providing a playback option to a user of the first client device associated with the first live content stream, the playback option including playback of the first known content starting at the playback position in the on-demand version of the first known content.

12. The method of claim 5, wherein the first known content comprises a specific content title.

13. The method of claim 5, wherein the first known content comprises a set of content titles or a category of content represented by a subset of the feature sets used to determine the first similarity measure.

14. A system, comprising:
memory; and
one or more computing devices configured to:
extract first information from a first live content stream;
generate one or more feature sets from the first extracted information;
compare the one or more feature sets generated from the first extracted information to a plurality of previously generated feature sets, each of the previously generated feature sets having been derived from a corresponding known content;
determine a first similarity measure for at least one of the one or more feature sets generated from the first extracted information and one or more of the previously generated feature sets corresponding to first known content;
determine that the first live content stream corresponds to the first known content based on the first similarity measure exceeding a threshold;
acquire first information related to the first known content;

transmit the first information to a first client device for presentation with the first live content;

extracting second information from a second live content stream;

generating one or more feature sets from the second extracted information;

comparing the one or more feature sets generated from the second extracted information to the plurality of previously generated feature sets;

determining a second similarity measure for at least one of the one or more feature sets generated from the second extracted information and one or more of the previously generated feature sets;

determining that the second similarity measure does not exceed the threshold;

identifying additional known content based on a comparison between a first feature set from the one or more feature sets generated from the second extracted information and a second feature set from the one or more of the previously generated feature sets;

acquiring second information related to the additional known content;

transmitting the acquired second information to a second client device for presentation with the second live content.

15. The system of claim 14, wherein each of the previously generated feature sets derived from the known content represents closed-caption information, an audio fingerprint, a video fingerprint, audio data representing a voice, image data representing a face, voice-to-text data, image-to-text data, or a content provider.

16. The system of claim 14, wherein each of the previously generated feature sets derived from the known content corresponds to a specific content title, a specific set of content titles, or a category of content.

17. The system of claim 14, wherein the one or more computing devices are configured to:

determine that programming guide information for the first live content stream does not match a portion of the acquired first information related to the first known content;

update the programming guide information using the acquired first information related to the first known content; and transmit the updated programming guide information to the first client device for presentation with the first live content stream.

18. The system of claim 14, wherein the one or more computing devices are configured to identify the additional known content by:

determining that a first subset of the first feature set and a second subset of the second feature set matches based on a confidence level;

identifying, based on determining that the first subset matches the second subset, at least one of a particular actor, a set of content titles, or recommended content having one or more characteristics in common with the second live content stream.

19. The system of claim 14, wherein the first information extracted from the first live content stream includes time-coded information, and wherein the one or more computing devices are configured to acquire the first information related to the first known content by identifying a playback position in the first live content stream using the time-coded information.

20. The system of claim 19, wherein the one or more computing devices are further configured to:

identify a playback position in an on-demand version of the first known content that corresponds to the playback position in the first live content stream; and provide a playback option to a user of the first client device associated with the first live content stream, the playback option including playback of the first known content starting at the playback position in the on-demand version of the first known content.

21. The system of claim 14, wherein the first known content comprises a set of content titles or a category of content represented by a subset of the feature sets used to determine the first similarity measure.

* * * * *